US011185189B2

(12) United States Patent
Huang et al.

(10) Patent No.: US 11,185,189 B2
(45) Date of Patent: Nov. 30, 2021

(54) COOKING APPARATUS

(71) Applicant: D & J Import-Export Ltd., Vancouver (CA)

(72) Inventors: Zhenxiong Huang, Foshan (CN); Yun Yang, Foshan (CN); Jun Zhang, Vancouver (CA); Feng Deng, Vancouver (CA)

(73) Assignee: D & J IMPORT-EXPORT LTD., Vancouver (CA)

( * ) Notice: Subject to any disclaimer, the term of this patent is extended or adjusted under 35 U.S.C. 154(b) by 312 days.

(21) Appl. No.: 16/248,574

(22) Filed: Jan. 15, 2019

(65) Prior Publication Data
US 2019/0142216 A1 May 16, 2019

Related U.S. Application Data

(63) Continuation of application No. 16/119,860, filed on Aug. 31, 2018.

(30) Foreign Application Priority Data

Sep. 1, 2017 (CN) .......................... 201721115465.7
Jan. 19, 2018 (CA) ...................................... 2992697
Mar. 29, 2018 (CA) ...................................... 3000125

(51) Int. Cl.
*A47J 37/06* (2006.01)
*A47J 36/20* (2006.01)
*A47J 36/16* (2006.01)

(52) U.S. Cl.
CPC ....... *A47J 37/0641* (2013.01); *A47J 37/0664* (2013.01); *A47J 36/165* (2013.01); *A47J 36/20* (2013.01)

(58) Field of Classification Search
CPC ...... A47J 36/165; A47J 37/0641; A47J 36/32; A47J 36/38; A47J 37/047; A47J 37/0623;
(Continued)

(56) References Cited

U.S. PATENT DOCUMENTS

| 5,590,583 A * | 1/1997 | Harrison | ............. A47J 37/0623 99/327 |
| 2005/0223906 A1* | 10/2005 | Xu | ....................... A47J 37/0641 99/348 |
| 2016/0007644 A1* | 1/2016 | Hack | ....................... A23L 3/003 99/333 |

FOREIGN PATENT DOCUMENTS

| CN | 203041956 | 7/2013 | |
| CN | 203234602 U * | 10/2013 | .......... A47J 37/0641 |

(Continued)

*Primary Examiner* — Ibrahime A Abraham
*Assistant Examiner* — Chris Q Liu
(74) *Attorney, Agent, or Firm* — Davis Wright Tremaine LLP; Heather M. Colburn

(57) ABSTRACT

A kitchen appliance in the form of a multi-purpose frying pan includes a base, a cover with a hot air system, an inner pot, a stirrer and a stirrer drive device. The inner pot can be removed from the base. A pot cavity is formed between the lid cover and the inner pot and the stirrer is located in the pot cavity, and the stirrer drive device is installed in the pan. Covered and on the outside of the hot air system, the stirrer drive device drives the stirrer to rotate. The stirrer drive device is disposed on the lid to prevent water or oil from polluting the motor during the cleaning of the cookware. The stirrer drive device is arranged on the outside of the hot air system to effectively prevent the drive device from blocking the transmission of hot air from the hot air system to the inner pot.

18 Claims, 11 Drawing Sheets

(58) Field of Classification Search
CPC ............... A47J 37/0629; A47J 37/1209; A47J 37/1257; A47J 43/0716; A47J 27/004; A47J 2202/00; A47J 2043/0733
USPC ....... 99/348, 339, 323.11, 323.5, 323.9, 331, 99/409, 450.1, 476, 535, 353, 333, 336, 99/410, 533
See application file for complete search history.

(56) References Cited

FOREIGN PATENT DOCUMENTS

| | | | | |
|---|---|---|---|---|
| CN | 105559629 A | * | 5/2016 | |
| CN | 105852674 A | * | 8/2016 | .......... A47J 37/0641 |
| CN | 107242769 A | * | 10/2017 | |

* cited by examiner

COOKING APPARATUS

TECHNICAL FIELD

The present disclosure relates to the technical field of kitchen appliances, and more particularly to a cooking apparatus.

BACKGROUND

Currently there are air fryers or frying pans with a hot air system. They are usually equipped with a rotating stirrer to prevent food from being over-cooked or from sticking to the pan. At present, there are mainly two ways to drive the stirrer. One is to install a drive device on the pan's base and transmit the power to a stirring paddle through a rotating shaft. However, such an arrangement may cause oil or water to drip to the drive device, which may result in damage to or reduced life of that device. The other is to place the drive device between the hot air system and the stirring paddle, and then to transmit rotational power to the stirring paddle through the rotating shaft. However, this arrangement affects the hot air transmission of the hot air system, which further reduces the already limited ventilation area, thus prejudicing cooking efficiency and results. Additionally, in conventional air fryers or frying pans the stirring paddle is usually permanently mounted on the cooker or inner pot, so cleaning the stirring paddle is difficult or inconvenient.

SUMMARY

According to a first aspect, there is provided a cooking apparatus comprising a base comprising a heating plate and an inner pot located over the heating plate; and a lid closable over the inner pot to form a cooking chamber, wherein the lid comprises a hot air system configured to direct hot air into the cooking chamber and a stirrer drive device configured to be attached to a stirrer.

The hot air system may comprise a hot air system motor, the stirrer drive device may comprise a drive motor, and the hot air system motor and the drive motor may be laterally offset from each other within the lid.

The lid may comprise a cover portion and a handle portion positioned above the cover portion, the stirrer drive device and the hot air system may span the cover and handle portions, and the hot air system motor and the drive motor may both located in the handle portion.

The stirrer drive device may further comprise a drive gear rotatable by the drive motor, and the apparatus may further comprise the stirrer. The stirrer may comprise a gear assembly detachably coupled to an underside of the lid; and a stirring paddle coupled to the gear assembly such that rotation of the gear assembly by the drive motor causes the stirring paddle to rotate.

The gear assembly may comprise a ring gear mated with the drive gear and a gear bracket spanning an interior of the ring gear.

The gear bracket may be positioned under the hot air system and comprise a cylindrical side that comprises ventilation holes for venting the hot air to the cooking chamber.

The ring gear may comprise teeth that mate with the drive gear and that face away from an axis of rotation of the gear assembly.

The stirrer may further comprise a positioning rod extending through a center of the gear assembly and into the lid; and a stop block at one end of the positioning rod that retains the gear assembly to the underside of the lid.

The positioning rod and the lid may be threaded to permit screwing and unscrewing of the positioning rod into and out of the lid.

The hot air system may comprise a propeller for propelling the hot air, and an axis of rotation of the propeller may be coaxial with an axis of rotation of the gear assembly.

A gear assembly protrusion may extend from an underside of the gear assembly, a paddle protrusion may extends from a top side of the stirring paddle, and the protrusions may be positioned such that rotation of the gear assembly causes the gear assembly protrusion to interfere with the paddle protrusion and rotate the stirring paddle.

The inner pot may comprise a groove shaped to receive a bottom edge of the stirring paddle, and the bottom edge of the stirring paddle may sit in the groove during stirring.

A bottom of the stirring paddle may slide against the inner pot during stirring, one of the stirring paddle and inner pot may comprise one of a protrusion and a groove and the other of the stirring paddle and inner pot comprises the other of the protrusion and groove, and the protrusion may fit into the groove during stirring.

The base may further comprise an outer pot in which the inner pot sits, and the heating plate may be between the inner and outer pots.

The hot air system may comprise a hot air heating element, and the apparatus may further comprise an upper temperature sensor located in the lid; a lower temperature sensor located in the base; a processor, communicatively coupled to the temperature sensors; and a memory, communicatively coupled to the processor, storing computer program code that is executable by the processor and that, when executed by the processor, causes the processor to operate in any one of multiple cooking modes, wherein for each of the cooking modes the computer program code causes the processor to perform a method comprising measuring an upper and a lower temperature using the upper and the lower temperature sensor, respectively; comparing the upper and the lower temperature to an upper and a lower temperature sensor setting, respectively; when the upper temperature differs from the upper temperature sensor setting, adjusting power to the hot air heating element such that the upper temperature approaches the upper temperature sensor setting; and when the lower temperature differs from the lower temperature sensor setting, adjusting power to the heating plate such that the lower temperature approaches the lower temperature sensor setting.

The hot air system may comprise a hot air system motor, the stirrer drive device may comprise a drive motor, and for at least one of the cooking modes the method may further comprise activating at least one of the motors.

The apparatus may further comprise a flip indicator, at least one of the cooking modes may be associated with a total cooking time, and the method may further comprise, for each of at least some of the cooking modes associated with the total cooking time, monitoring elapsed cooking time during the cooking mode; comparing the elapsed cooking time to the total cooking time; and when the elapsed cooking time is at least a threshold percentage of the total cooking time, activating the flip indicator.

The apparatus may further comprise a lid open sensor configured to detect whether the lid is opened or closed, and the method may further comprise, for each of at least some of the cooking modes associated with the total cooking time, deactivating the flip indicator in response to the lid being opened.

The apparatus may further comprise a user interface communicatively coupled to the processor, and the method may further comprise receiving, via the user interface, a numerically specified temperature for at least one of the upper and lower temperature sensor settings.

The method may further comprise receiving a signal via the user interface to pause cooking during one of the cooking modes, and the numerically specified temperature may be received while cooking is paused.

The apparatus may further comprise a user interface communicatively coupled to the processor and the method may further comprises, when the apparatus is operating in one of the cooking modes, receiving, via the user interface, within an extension window extending from an end of the cooking mode, an extension input indicating that the cooking mode is to be extended; and in response to the extension input, extending the cooking mode by an extension duration without ending the cooking mode.

The stirrer may rotate in the cooking mode in which the apparatus is operating when the extension input is received.

According to another aspect, there is provided a cooking apparatus comprising a base comprising an inner pot; a lid closable over the inner pot to form a cooking chamber, wherein the lid comprises a hot air system configured to direct hot air into the cooking chamber and a stirrer drive device; and a stirrer attached to the stirrer drive device, the stirrer comprising a gear assembly detachably coupled to an underside of the lid; and a stirring paddle coupled to the gear assembly such that rotation of the gear assembly causes the stirring paddle to rotate.

The hot air system may comprise a hot air system motor, the stirrer drive device may comprise a drive motor, and the hot air system motor and the drive motor may be laterally offset from each other within the lid.

The lid may comprise a cover portion and a handle portion positioned above the cover portion, the stirrer drive device and the hot air system may span the cover and handle portions, and the hot air system motor and the drive motor may both be located in the handle portion.

The stirrer drive device may further comprise a drive gear rotatable by the drive motor, and the gear assembly may comprise a ring gear mated with the drive gear.

The gear assembly may further comprise a gear bracket spanning an interior of the ring gear.

The gear bracket may be positioned under the hot air system and comprise a cylindrical side that comprises ventilation holes for venting the hot air to the cooking chamber.

The ring gear may comprise teeth that mate with the drive gear and that face away from an axis of rotation of the gear assembly.

The stirrer may further comprise a positioning rod extending through a center of the gear assembly and into the lid; and a stop block at one end of the positioning rod that retains the gear assembly to the underside of the lid.

The positioning rod and the lid may be threaded to permit screwing and unscrewing of the positioning rod into and out of the lid.

The hot air system may comprise a propeller for propelling the hot air, and an axis of rotation of the propeller may be coaxial with an axis of rotation of the gear assembly.

A gear assembly protrusion may extend from an underside of the gear assembly, a paddle protrusion may extend from a top side of the stirring paddle, and the protrusions may be positioned such that rotation of the gear assembly causes the gear assembly protrusion to interfere with the paddle protrusion and rotate the stirring paddle.

The inner pot may comprise a groove shaped to receive a bottom edge of the stirring paddle, and the bottom edge of the stirring paddle may sit in the groove during stirring.

A bottom of the stirring paddle may slide against the inner pot during stirring, one of the stirring paddle and inner pot may comprise one of a protrusion and a groove and the other of the stirring paddle and inner pot may comprise the other of the protrusion and groove, and the protrusion may fit into the groove during stirring.

The base may comprise a heating plate positioned under the inner pot.

The base may further comprise an outer pot in which the inner pot sits, and the heating plate may be between the inner and outer pots.

The base may comprise a heating plate under the inner pot, the hot air system may comprise a hot air heating element, and the apparatus may further comprise an upper temperature sensor located in the lid; a lower temperature sensor located in the base; a processor, communicatively coupled to the temperature sensors; and a memory, communicatively coupled to the processor, storing computer program code that is executable by the processor and that, when executed by the processor, causes the processor to operate in any one of multiple cooking modes, wherein for each of the cooking modes the computer program code causes the processor to perform a method comprising measuring an upper and a lower temperature using the upper and the lower temperature sensor, respectively; comparing the upper and the lower temperature to an upper and a lower temperature sensor setting, respectively; when the upper temperature differs from the upper temperature sensor setting, adjusting power to the hot air heating element such that the upper temperature approaches the upper temperature sensor setting; and when the lower temperature differs from the lower temperature sensor setting, adjusting power to the heating plate such that the lower temperature approaches the lower temperature sensor setting.

The hot air system may comprise a hot air system motor, the stirrer drive device may comprise a drive motor, and for at least one of the cooking modes the method may further comprise activating at least one of the motors.

The apparatus may further comprise a flip indicator, at least one of the cooking modes may be associated with a total cooking time, and the method may further comprise, for each of at least some of the cooking modes associated with the total cooking time, monitoring elapsed cooking time during the cooking mode; comparing the elapsed cooking time to the total cooking time; and when the elapsed cooking time is at least a threshold percentage of the total cooking time, activating the flip indicator.

The apparatus may further comprise a lid open sensor configured to detect whether the lid is opened or closed, and the method may further comprise, for each of at least some of the cooking modes associated with the total cooking time, deactivating the flip indicator in response to the lid being opened.

The apparatus may further comprise a user interface communicatively coupled to the processor and the method may further comprise receiving, via the user interface, a numerically specified temperature for at least one of the upper and lower temperature sensor settings.

The method may further comprise receiving a signal via the user interface to pause cooking during one of the cooking modes, and the numerically specified temperature may be received while cooking is paused.

The apparatus may further comprise a user interface communicatively coupled to the processor and the method may further comprises, when the apparatus is operating in one of the cooking modes, receiving, via the user interface, within an extension window extending from an end of the cooking mode, an extension input indicating that the cooking mode is to be extended; and in response to the extension input, extending the cooking mode by an extension duration without ending the cooking mode.

The stirrer may rotate in the cooking mode in which the apparatus is operating when the extension input is received.

According to another aspect, there is provided a multi-functional frying pan comprising a base, a lid with a hot air system, an inner pot, a stirrer, and a stirrer drive device. The inner pot is detachably affixed or placed in the base. Once closed, the lid and the inner pot form a cooking chamber with the stirrer placed inside. The stirrer drive device is mounted on the outside of the hot air system on top of the lid. The stirrer drive device drives the stirrer and causes it to rotate. Placing the stirrer drive device on the lid helps to prevent contamination of a drive motor, which comprises part of the stirrer drive device, by water or oil during cleaning. Placing the stirrer drive device outside of the hot air system may effectively prevent hot air circulation from being blocked or disrupted by the drive device, thus helping to ensure cooking efficiency and results. This design may make adapting to different shapes of the lid and consequent changing locations of the drive motor easier.

The stirrer may comprise a gear assembly, a stirring paddle, and a positioning rod. The gear assembly may comprise an annular ring gear and a gear bracket. The ring gear and the gear bracket can be a one-piece part, or two separate pieces affixed together. The stirring paddle may be detachable from the gear bracket. The gear bracket and stirring paddle may be easily disassembled for easy cleaning. The positioning rod may pass through the center of the gear bracket and be attached to the lid. The gear bracket may rotate around the positioning rod. Ventilation holes may be on the gear bracket. The stirrer drive device may comprise a drive gear, which drives the ring gear to rotate. The stirring paddle and gear bracket may be easily removed for cleaning.

Ventilation holes on the gear bracket can effectively allow the hot air from the hot air system being transmitted to the pan. The gear bracket may rotate so that the ventilation holes keep moving, thus redirecting air flow more evenly and, in certain aspects in all directions, and promoting and improving cooking efficiency and results.

The stirring paddle may be placed on the inner pot. After the lid is closed, the gear bracket may drive the stirring paddle to rotate and stir. The rotating shaft of the stirring paddle may be coaxial with the rotating shaft of the ring gear. The stirring paddle and gear bracket in certain aspects are not attached to each other. When the lid is open, the stirring paddle may be detached from the gear bracket, which makes it easier to remove and clean.

A round groove may be on the inner pot, and the groove may match a protrusion at the bottom of the stirring paddle. This tongue-and-groove design helps to line up the stirring paddle precisely.

A round protrusion may be on the inner pot, and the groove may match the groove at the bottom of the stirring paddle. This tongue-and-groove design may help to line up the stirring paddle precisely.

The protrusions may be cylindrical, conical, or truncated conical protrusions. The corresponding grooves may accordingly be cylindrical, conical, or truncated conical grooves.

The base may comprise a housing and an outer pot. The outer pot may be affixed in the housing. The inner pot may be attached or simply placed in the outer pot. The outer pot may also play a role in insulation and supporting the inner pot.

The multi-function frying pan may comprise a heating plate, which may be fixed to the outer pot. The inner pot may be placed on top of the heating plate. Use of the heating plate may increase the heating temperature at the bottom of one or both of the pots.

According to another aspect, there is provided a cooking apparatus comprising a base comprising an inner pot; a lid closable over the inner pot to form a cooking chamber; at least one of a heating plate and hot air heating element positioned to heat the cooking chamber; a flip indicator; a processor, communicatively coupled to the flip indicator and the at least one of the heating plate and hot air heating element; and a memory, communicatively coupled to the processor, storing computer program code that is executable by the processor and that, when executed by the processor, causes the processor to operate in a cooking mode that is associated with a total cooking time and to perform a method comprising monitoring elapsed cooking time during the cooking mode; comparing the elapsed cooking time to the total cooking time; and when the elapsed cooking time is at least a threshold percentage of the total cooking time, activating the flip indicator.

This summary does not necessarily describe the entire scope of all aspects. Other aspects, features and advantages will be apparent to those of ordinary skill in the art upon review of the following description of specific embodiments.

BRIEF DESCRIPTION OF THE DRAWINGS

In the accompanying drawings, which illustrate one or more example embodiments.

DETAILED DESCRIPTION

Figure 1:
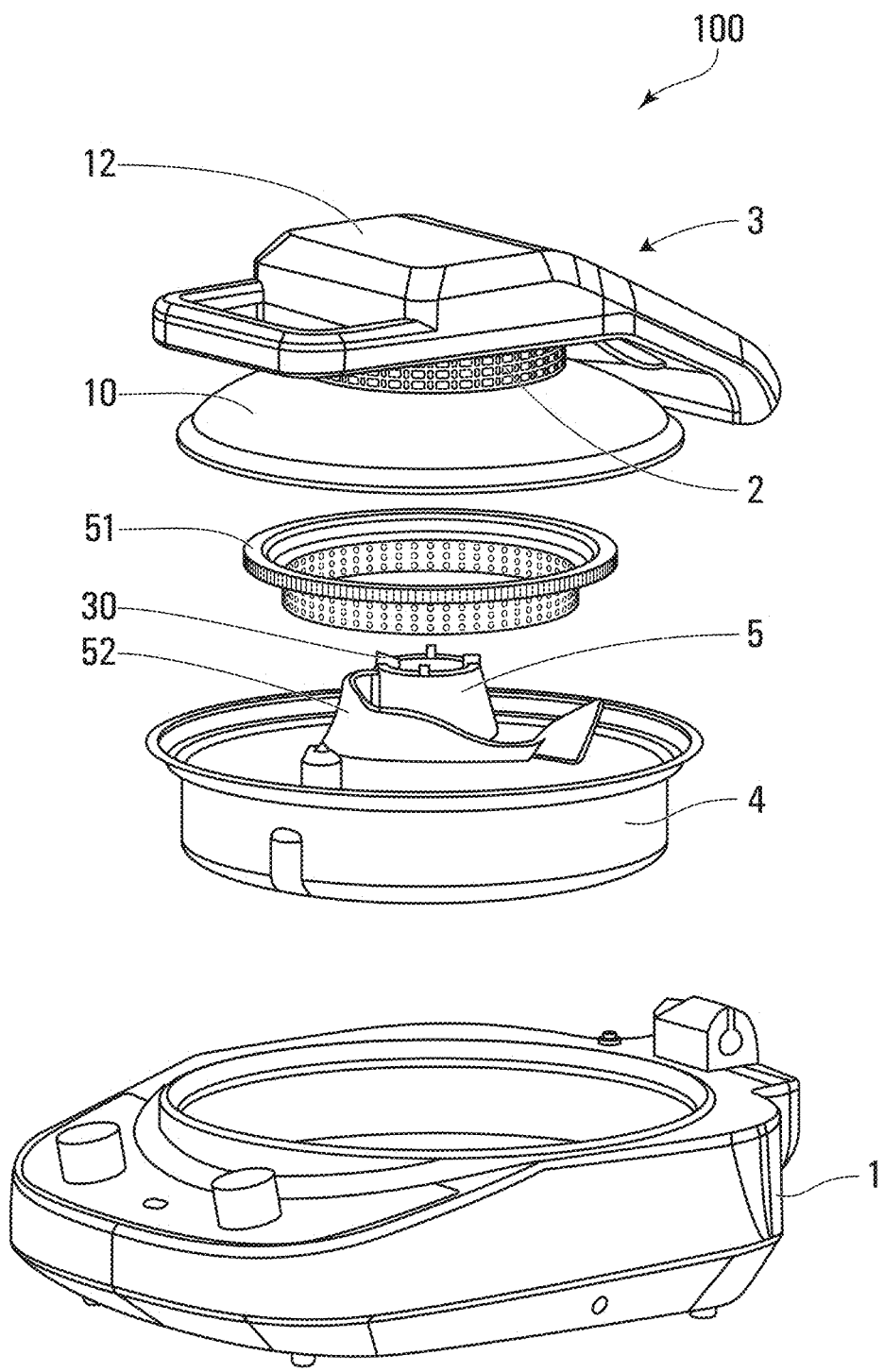
FIG. 1 depicts an exploded view of a cooking apparatus, according to one example embodiment.

At least some example embodiments described herein are directed at a cooking apparatus that can effectively protect an electrical motor and prevent it from being damaged by liquids, such as oil, during one or both of pan use and cleaning. In at least some example embodiments the apparatus may act as a multi-purpose frying pan; i.e., it may be able to cook food in any one or more of multiple cooking modes, of which at least one fries the food being cooked. In at least some example embodiments, the apparatus comprises a heat plate in its base so that food being cooked in the apparatus can be heated by one or both of convection (by hot air circulated by a hot air system that comprises the electrical motor) and conduction (by the heat plate). Additionally or alternatively, in at least some example embodiments a gear assembly attached to an underside of the apparatus's lid and used to rotate a stirrer is removable from the lid, thereby facilitating cleaning of the gear assembly and the hot air system.

As shown in FIGS. 1-8, in at least one example embodiment a cooking apparatus 100 comprises a base 1, a lid 3 with a hot air system 2, an inner pot 4, a stirrer 5, and a stirrer drive device 6. The inner pot 4 is attached to or placed in the base 1. When the lid 3 is closed, it forms a cooking chamber with the inner pot 4. The stirrer 5 is located inside the chamber. The stirrer drive device 6 is mounted on the lid 3 and on the outside of the hot air system 2. The stirrer drive device 6 drives the stirrer 5 to rotate.

FIG. 1 shows an exploded view of the apparatus 100. The inner pot 4 sits on the base 1, and a stirring paddle 52 that comprises part of the stirrer 5 sits on the inner pot 4. The lid 3 comprises a handle portion 12 and a cover portion 10, with the handle portion 12 attached to a top side of the cover portion 10. Within the handle portion 12 resides a hot air system motor 16 (depicted in FIGS. 2 and 4) and a drive motor 14 (also depicted in FIGS. 2 and 4), which comprises part of the stirrer drive device 6. The cover portion 10 delineates a top of the cooking chamber when the lid 3 is closed over the inner pot 4. Attached to an underside of the cover portion 10 is a gear assembly 51, which comprises part of the stirrer 5 and which is rotatably driven by the stirrer drive device 6. Gear assembly protrusions 32 (shown in FIGS. 5 and 7) on an underside of the gear assembly 51 are rotated against analogous paddle protrusions 30 located on a top side of the stirring paddle 52, thereby rotating the paddle 52.

Figure 2:
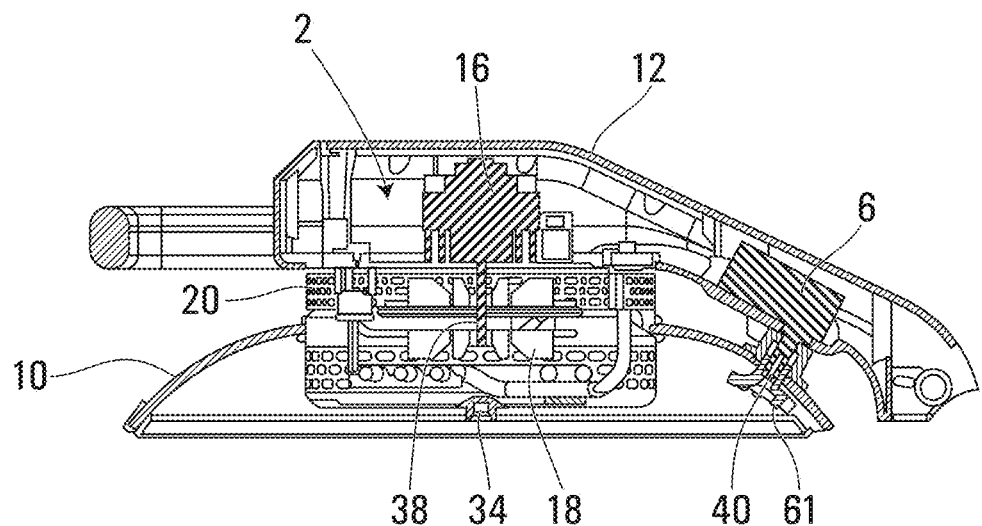
FIG. 2 is a sectional view of a lid, which comprises part of the apparatus of FIG. 1.
Figure 3:
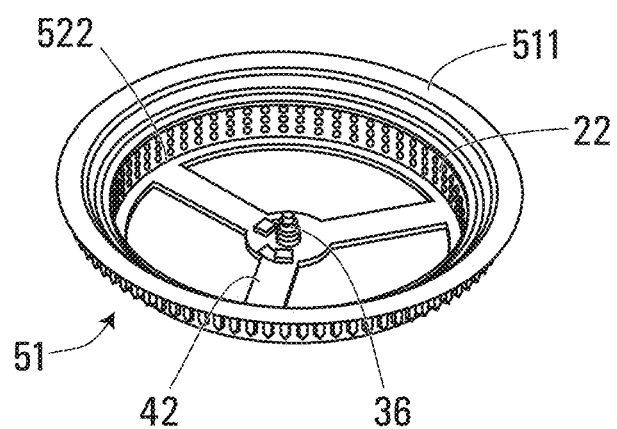
FIG. 3 is a perspective view of a gear assembly that comprises part of the apparatus of FIG. 1.
Figure 4:
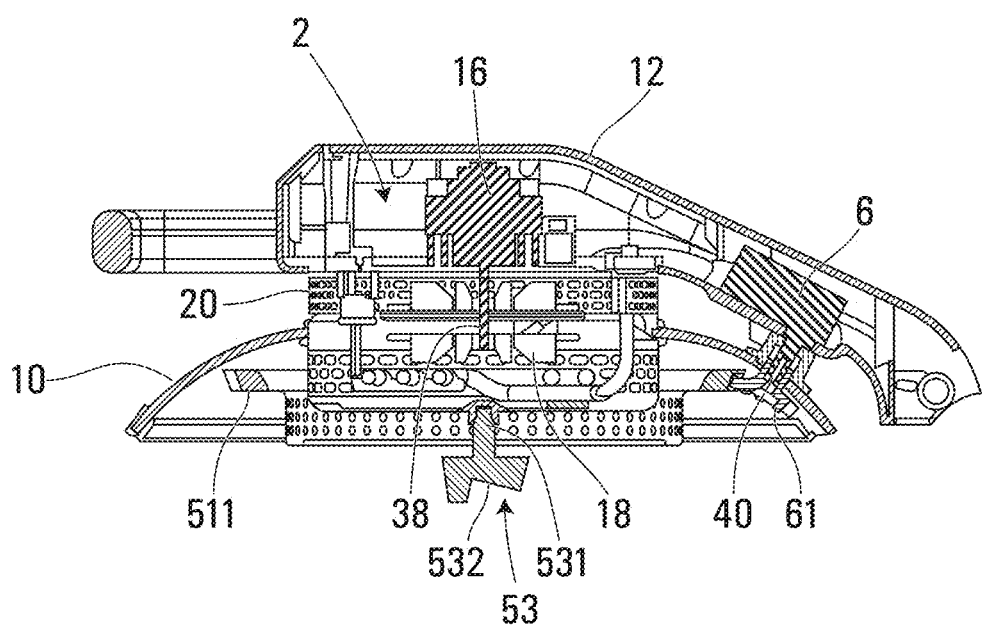
FIG. 4 is a sectional view of the lid of FIG. 2, coupled to gear assembly of FIG. 3.

Referring now to FIGS. 2-4, there are shown a sectional view of the lid 3 when the lid 3 is not coupled to the gear assembly 51, a perspective view of the gear assembly 51 itself, and a sectional view of the lid 3 when it is coupled to the gear assembly 51, respectively.

FIG. 2 shows the handle portion 12 attached to and positioned over the cover portion 10. A hot air system motor 16 that comprises part of the hot air system 2 and a drive motor 14 that comprises part of the stirrer drive device 6 are both positioned within the handle portion 12. The cover portion 10 is rotationally symmetric about a rotational axis. The hot air system motor 16 comprises an output shaft 38 that is coaxial with the rotational axis. The motor's 16 output shaft 38 is attached to and consequently rotates a propeller 18, which propels hot air through the cooking chamber when the lid 3 is closed and the hot air system 2 is on. The propeller's 18 axis of rotation is coaxial with the output shaft 38, and the propeller 18 is contained within a ventilated air system housing 20. At the bottom of the housing 20 and coaxial with the rotational axis is an aperture 34 for receiving a shaft 531 of a positioning rod 53, as discussed further below.

The drive motor 14 of the stirrer drive device 6 is positioned within the handle portion 12 and is laterally offset from the hot air system motor 16. The drive motor 14 comprises an output shaft 40; due to the curvature of the handle portion 12 and as the drive motor 14 is laterally offset from the hot air system motor 16, the output shafts 40,38 of the drive motor 14 and hot air system motor 16 are not coaxial or parallel. The output shaft 40 rotates a drive gear 61, which in turn rotates the gear assembly 51, as discussed further below.

The gear assembly 51 as depicted in FIG. 3 comprises a ring gear 511 that circumscribes a gear bracket 522. In the depicted embodiment the gear 511 and bracket 522 are integral; they may, for example, be welded together. In at least some different embodiments (not depicted), the gear 511 and bracket 522 may be detachably coupled together, such as by using clips. The gear bracket 522 comprises a generally cylindrical wall that has ventilation holes 22. Extending between the wall and the bracket's 522 center are three bracing arms 42. The arms 42 converge at a location that includes an aperture 36 about which the cylindrical wall is rotationally symmetric.

FIG. 4 depicts a sectional view of the lid 3 with the gear assembly 51 detachably coupled to the underside of the cover portion 10. Detachably coupling the assembly 51 to the cover portion 10 permits the assembly 51 to be removed, thereby making cleaning of the gear assembly 51 and the air system housing 20 more convenient. The stirrer 5 comprises the gear assembly 51, the stirring paddle 52 (depicted in FIGS. 1, 5, 8, and 9), and the positioning rod 53. The positioning rod 53 comprises a shaft 531 having a stop block 532 at one end. The shaft 531 is threaded and screwable into the underside of the cover portion 10 through the apertures 36,34. When the gear assembly 51 is positioned such the aperture 36 in the gear bracket 522 is coaxial with the aperture 34 in the air system housing 20, and the shaft 531 is subsequently screwed into and thereby affixed to the cover portion 10, the stop block 532 positions and restricts the gear bracket 522 between the stop block 532 and the lid 3. The teeth, which are on the outside of the ring gear 511, mesh with the teeth of the drive gear 61, which comprises part of the stirrer drive device 6. Consequently, when the drive motor 14 drives the output shaft 40, the drive gear 61 drives the ring gear 511 to rotate, which causes the gear bracket 522 to rotate about the shaft 531 and the stirring paddle 52 to rotate as discussed further below. While the stop block 532 is used to retain the gear assembly 51 in the depicted embodiment, in at least some different embodiments (not depicted), the gear assembly 51 may be detachably coupled to the lid 3 in a different manner. For example, the gear assembly 51 may be detachably coupled to the lid 3 magnetically, by using clips, or the gear assembly 51 may be threaded and screwed into the lid 3.

Figure 5:
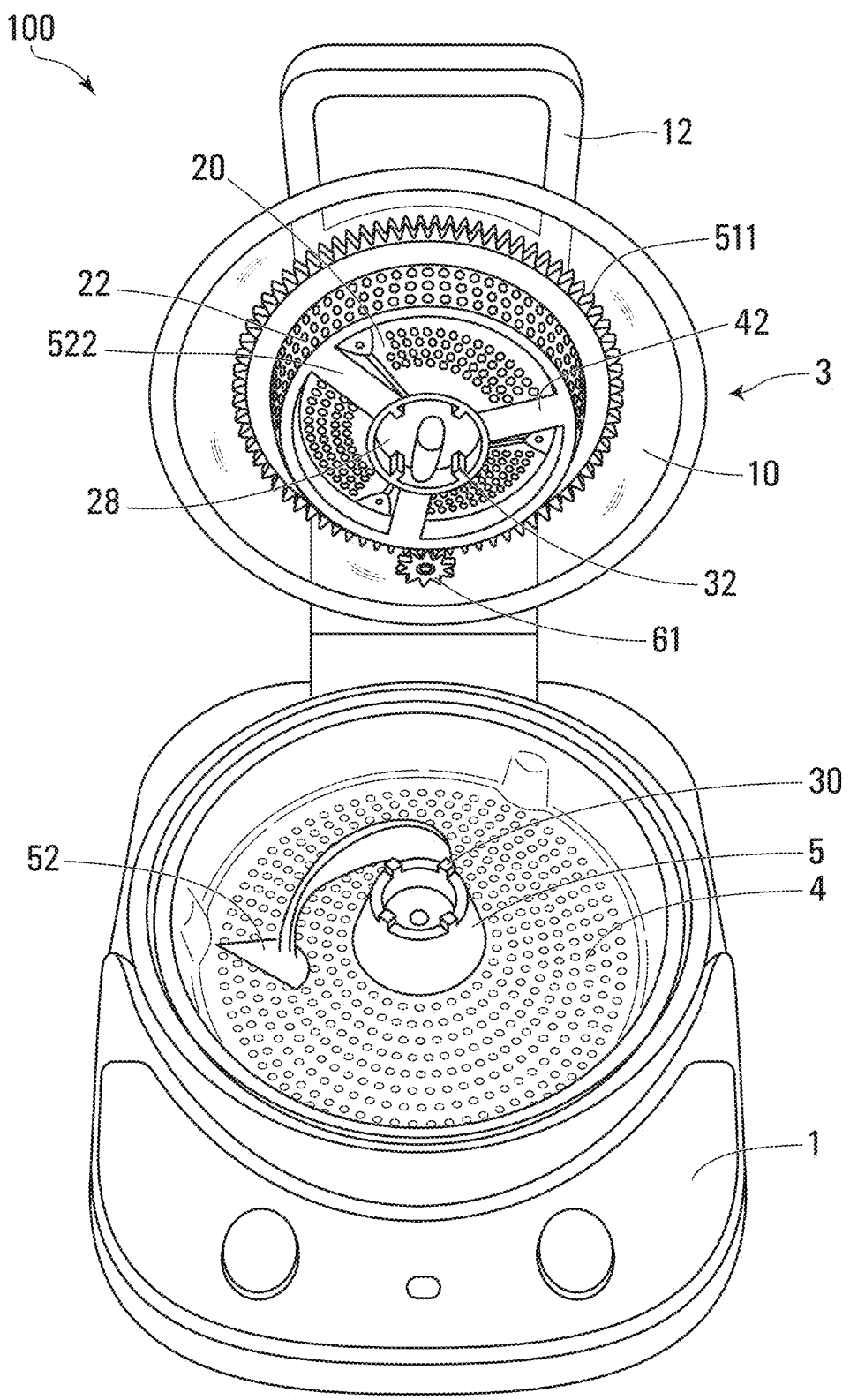
FIG. 5 is a front perspective view of the apparatus of FIG. 1 with its lid open.
Figure 7:
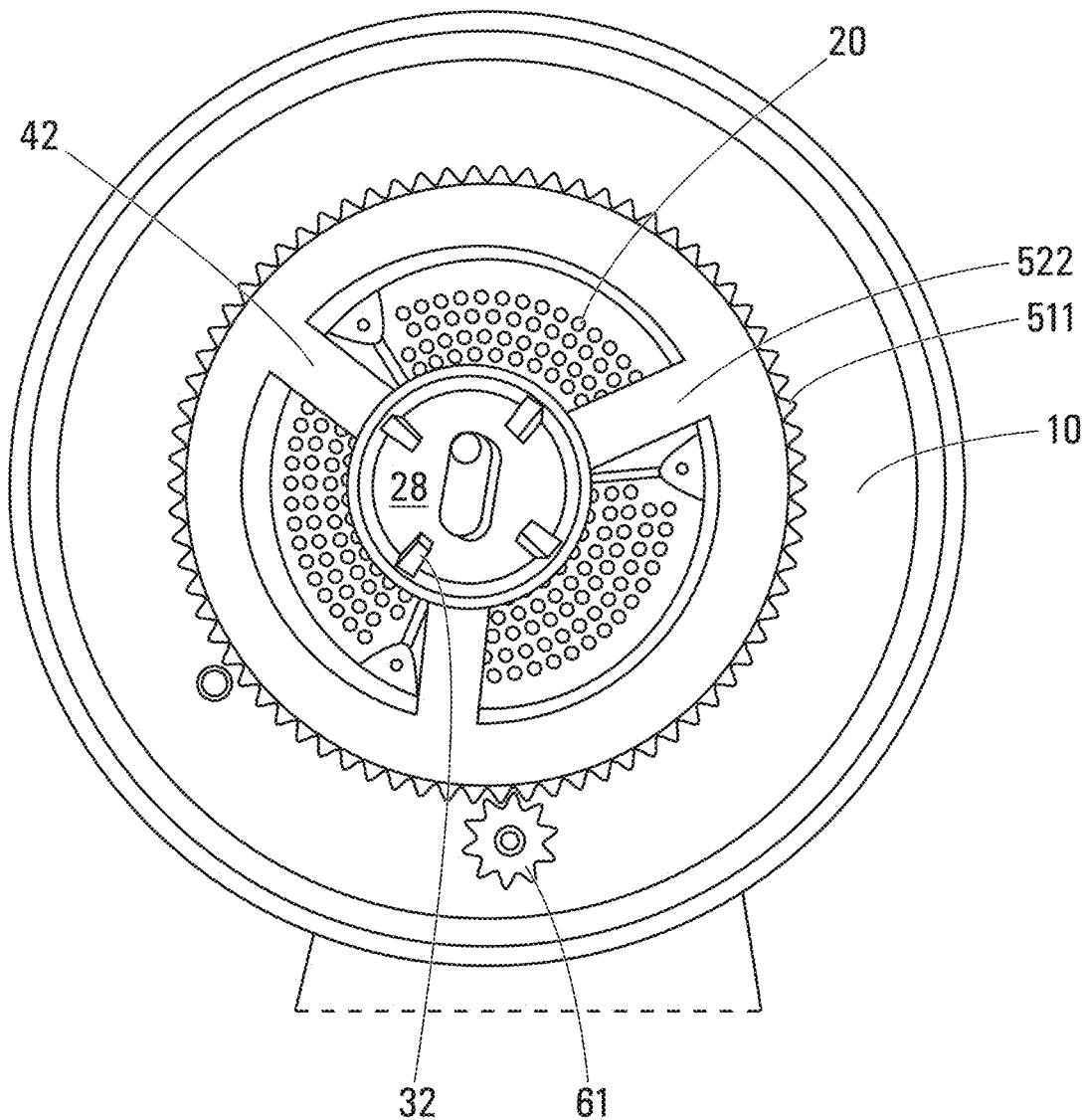
FIG. 7 is a bottom plan view of the lid of the apparatus of FIG. 1.

Referring now to FIGS. 5 and 7 in particular, a disc 28 secured to an underside of the gear bracket 522 is visible. Extending from an underside of the disc 28 are gear assembly protrusions 32. The stirring paddle 52 is placed on the inner pot 4 and similarly shaped paddle protrusions 30 extend from a top side of the paddle 52. The protrusions 30,32 are positioned such that when the gear assembly 51 is secured to the underside of the lid 3 and the lid 3 is closed, rotation of the gear assembly 51 causes the gear assembly protrusions 32 to rotate, which consequently interfere with the paddle protrusions 30 and drive the stirring paddle 52 to rotate and stir. The paddle 52, disc 28, gear assembly 51, and propeller 18 all rotate about the common rotation axis.

The disc 28 in the depicted embodiment is positioned centrally on the gear bracket 522 such that the positioning shaft 531 extends through it; however, in at least some alternative embodiments (not depicted) the disc 28 may be elsewhere positioned, or may be absent entirely. For example, in at least some alternative embodiments, the protrusions 32 may extend directly from the underside of the arms 42.

In at least one example alternative embodiment, a structure for the stirring mechanism follows: the stirrer 5 comprises the large gear assembly 51, the stirring paddle 52, and the positioning rod 53. The gear assembly 51 comprises the ring gear 511 and the gear bracket 522, which can be integrally one piece or two pieces mounted together. The stirring paddle 52 is detachable from the gear bracket 522. The positioning rod 53 passes through the center of the gear bracket 522 and is attached to the lid 3. The gear bracket 522 can rotate about the positioning rod 53. The gear bracket 522 has ventilation holes. The stirrer driving device 6 comprises the drive gear 61, which drives the ring gear 511 to rotate. The teeth of the ring gear 511 may face towards or, as shown in the embodiment of FIGS. 3 and 4, away from the gear's 511 axis of rotation.

Figure 6:
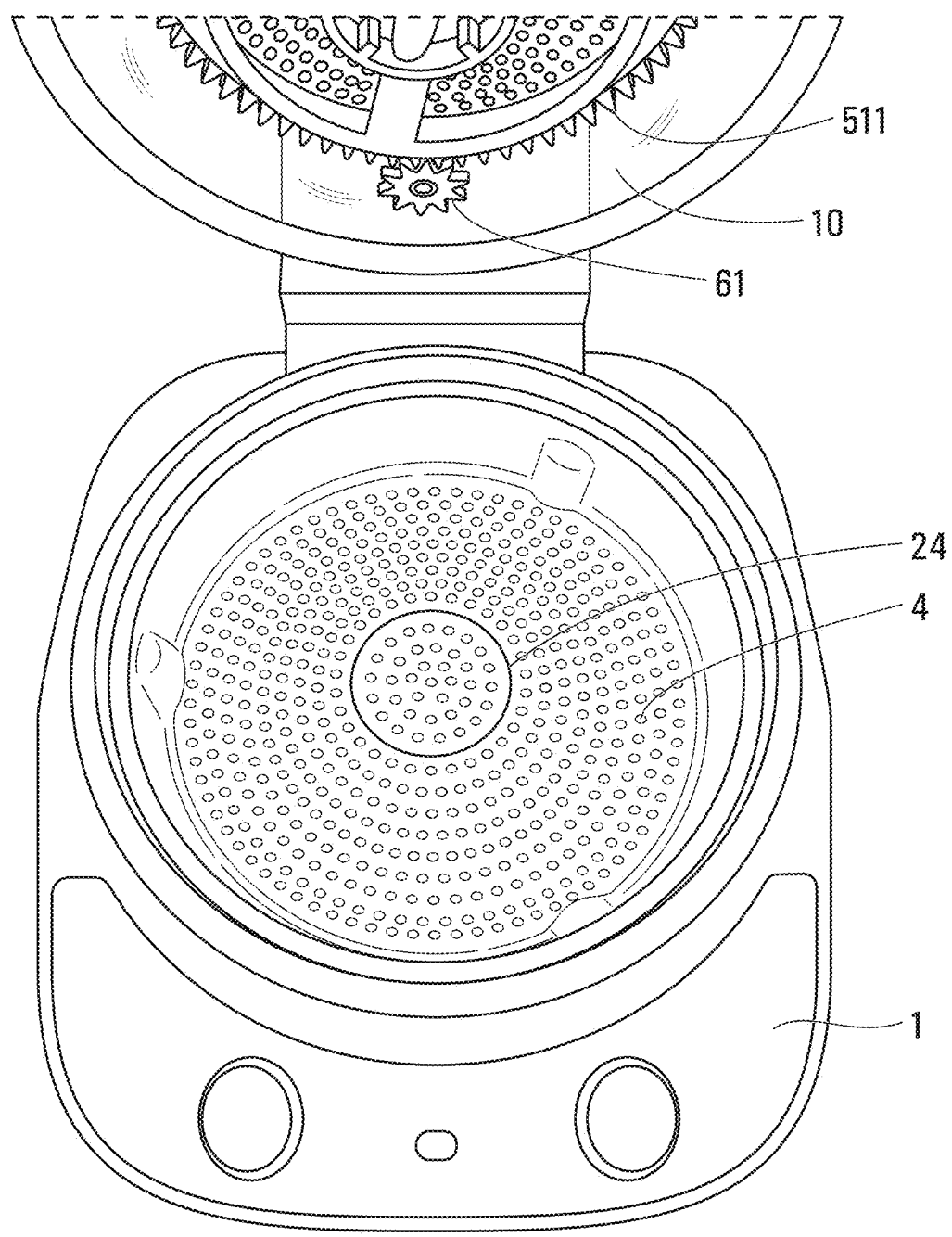
FIG. 6 is a front perspective view of the base of the apparatus of FIG. 1.
Figure 8:
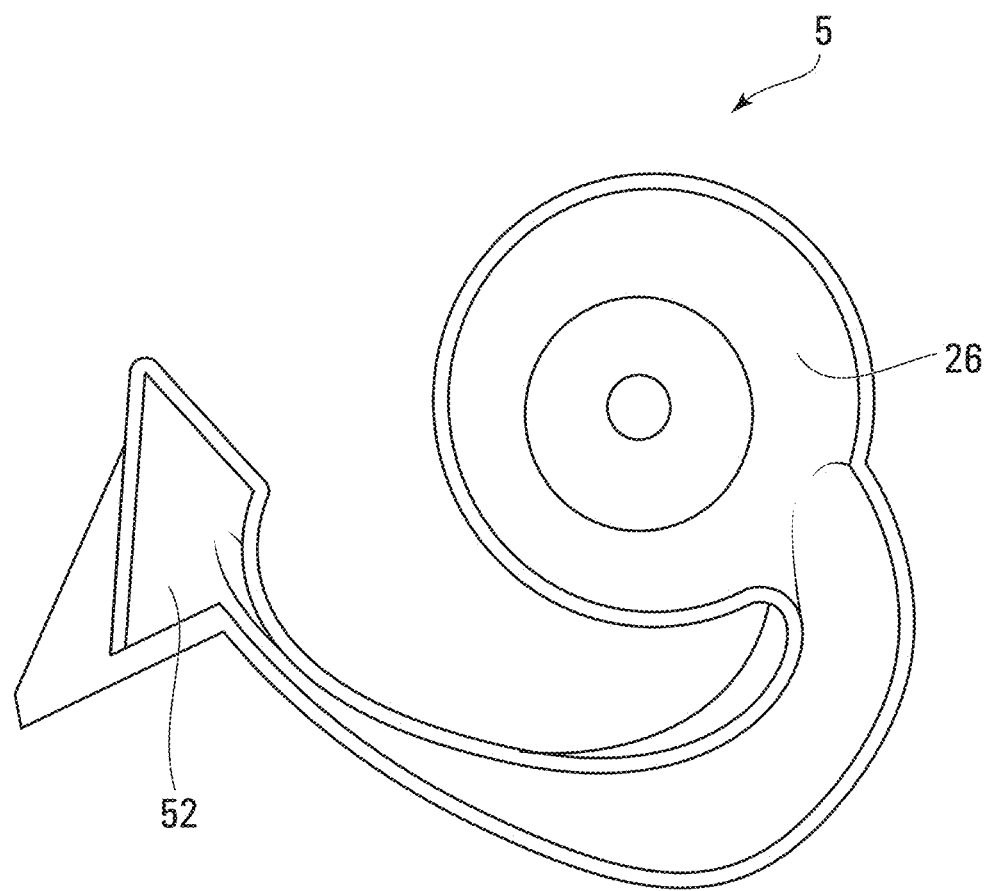
FIG. 8 is a bottom plan view of a stirring paddle that comprises part of the apparatus of FIG. 1.

Referring now to FIGS. 6 and 8 in particular, there are shown a front perspective view of the apparatus's 100 base 1 and a bottom plan view of the stirring paddle 52, respectively. The inner pot 4 is shown sitting in the base 1 in FIG. 6, and has a groove 24 shaped such that a bottom edge 26 of the paddle 52 fits therein. The groove 24 helps to retain the paddle 52 in a set location while it is being driven by the stirrer drive device 6.

While the groove 24 is shown as being in the inner pot 4 with the paddle 52 fitting in the groove 24, in at least some alternative embodiments (not depicted) one or more grooves 24 may additionally or alternatively be in the paddle 52, and a portion of the inner pot 4 or elsewhere in the base 1, such as a protrusion extending therefrom, may fit in those one or more grooves 24. Furthermore, while the bottom edge 26 of the paddle 52 fits in the groove 24 in the depicted embodiment, in at least some alternative embodiments (not depicted) a different portion of the paddle 52, such as a protrusion extending therefrom, may fit in the groove 24.

Additionally, while the groove 24 in the depicted embodiment is circular, in at least some alternative embodiments (not depicted) the groove 24 may be differently shaped. For example, the protrusions may be cylindrical, conical, frusto-conical protrusions, or a combination thereof; and the corresponding grooves may accordingly be cylindrical, conical, or frusto-conical, or a combination thereof.

Figure 9:
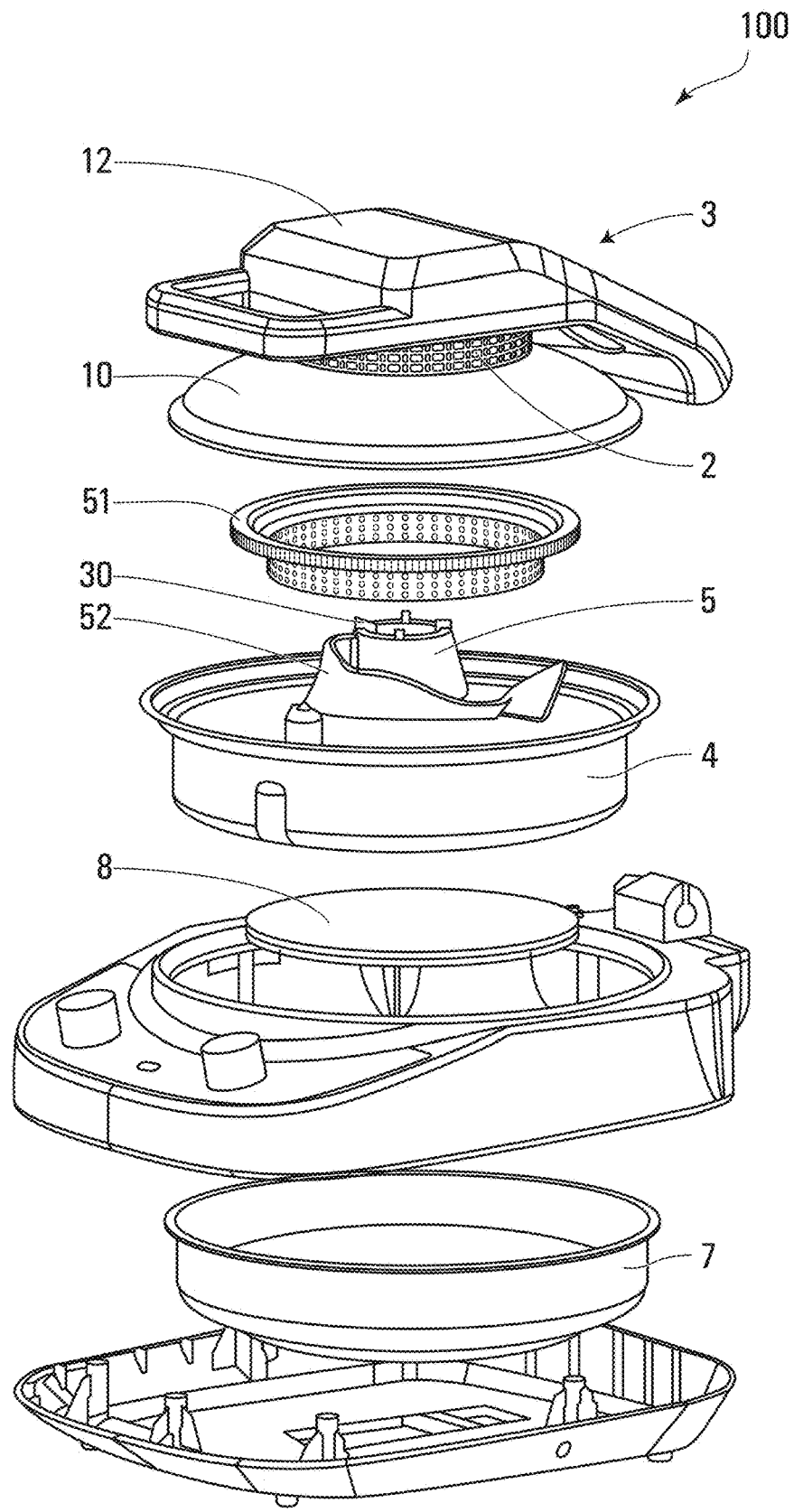
FIG. 9 depicts an exploded view of a cooking apparatus, according to another example embodiment.

Referring now to FIG. 9, there is shown an exploded view of the apparatus 100, according to another example embodiment. The apparatus 100 of FIG. 9 is identical to the apparatus 100 of FIGS. 1-8, except the base 1 further comprises a housing and an outer pot 7 positioned therein, and a heating plate 8 between the pots 4,7. The outer pot 7 may be permanently or detachably coupled to the housing 1. The inner pot 4 in the depicted example embodiment sits in the outer pot 7; in at least some different embodiments (not depicted), the inner pot 4 may be affixed to the outer pot 7 in some manner, such as by using a type of permanent or detachable coupling. The heating plate 8 is affixed to an interior of the outer pot 7, and the pot body of the inner pot 4 is placed on top of the heating plate 8.

In the embodiment of FIG. 9, cooking may be performed using one or both of convection (by means of the hot air system 2) and conduction (by means of the heating plate 8). Furthermore, while the gear assembly 51 is detachably coupled to the lid 3 in the embodiment of FIG. 9, in at least some different embodiments, the apparatus 100 may comprise the heating plate 8 and the gear assembly 51 may be permanently attached (e.g., through welding) to the lid 3.

Cooking Modes

Figure 10:
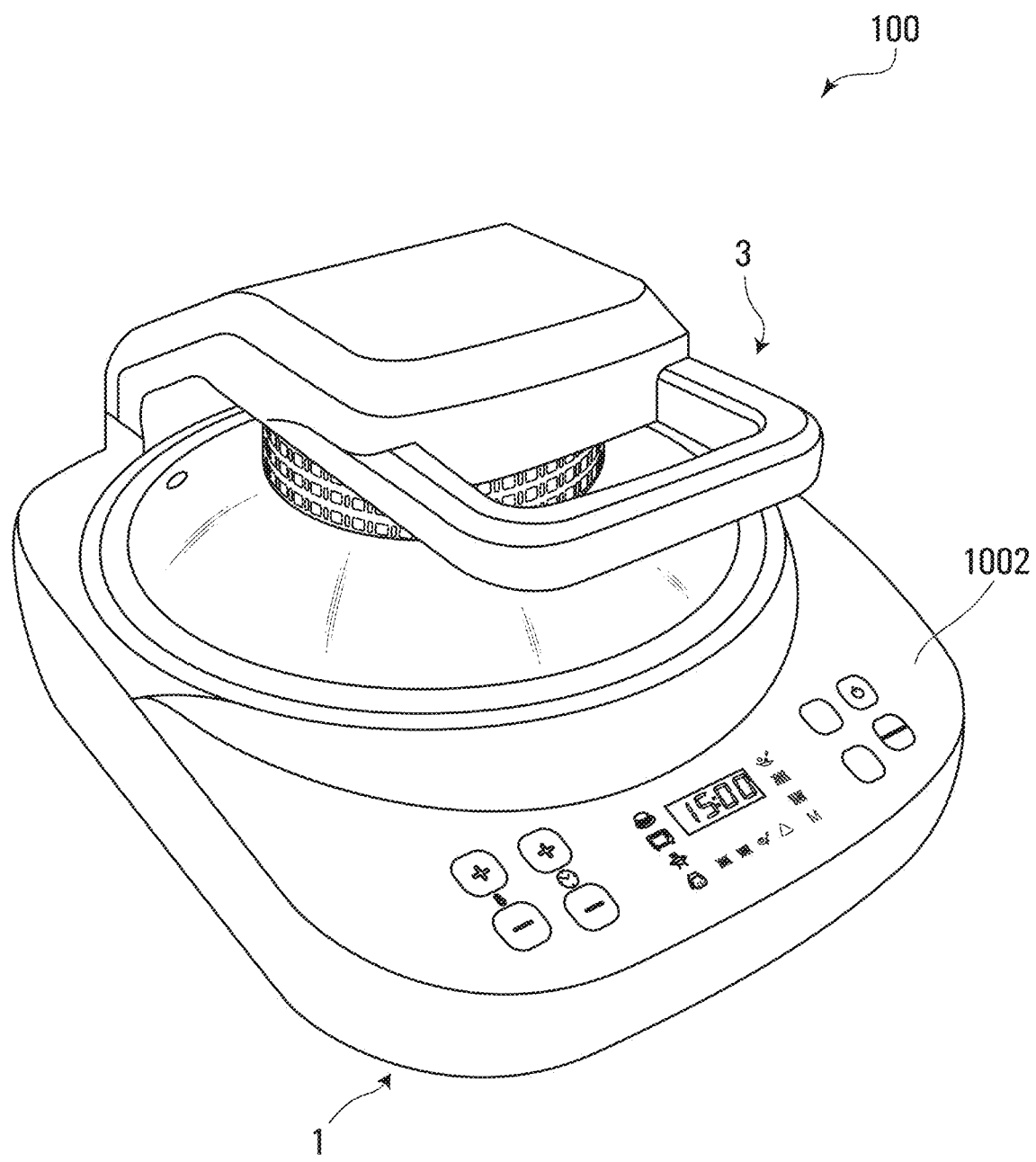
FIG. 10 depicts a perspective view of a cooking apparatus, according to another example embodiment.

Referring now to FIG. 10, there is depicted another embodiment of the apparatus 100. The embodiment of the apparatus 100 depicted in FIG. 10 generally comprises the base 1 and the lid 3, as the embodiments depicted in FIGS. 1-9 do, and additionally comprises a user interface 1002 as depicted in greater detail in FIG. 11 and a control system 1200 as depicted in FIG. 12. The user interface 1002 and control system 1200 permit a user of the apparatus 100 to operate it in any one of several cooking modes, as discussed further below.

Referring now to FIG. 12, the control system 1200 comprises a processor 1202 that is communicatively coupled to various components comprising part of the apparatus 100. As discussed in further detail in respect of FIG. 11, below, the processor 1202 exchanges data with the user interface 1002 in order to receive user input regarding how the apparatus 100 is to operate, and provide the user with information on the apparatus's 100 current operations. The processor 1202 also exchanges data with flash memory 1214 and random access memory (RAM) 1216. The flash memory 1214 is an example of non-volatile memory, and stores computer program code that, when executed, causes the processor 1202 and consequently the apparatus 100 to operate in any one or more of the cooking modes discussed below and to interface with the user via the user interface 1002. The RAM 1216 is an example of volatile memory, and acts as working memory for the processor 1202 while executing all or some of that computer program code.

The processor 1202 receives information from three different sensors: an upper thermistor 1204 that is located in the lid 3, a lower thermistor 1206 that is located in the base 1, and a lid open sensor 1208 that determines whether the lid 3 is opened or closed. In at least the depicted example embodiment, the upper thermistor 1204 is positioned within the air system housing 20 and the lower thermistor 1206 is positioned adjacent the heating plate 8; however, in different example embodiments (not depicted), the thermistors 1204, 1206 may be differently positioned. The upper thermistor 1204 is used to measure the temperature of the hot air at an upper edge of the propeller 18 and the lower thermistor 1206 is used to measure the temperature inside the inner pot 4. The lid open sensor 1208 comprises a switch located in one or both of the base 1 and lid 3; for example, in at least one example embodiment the lid open sensor 1208 may comprise a Hall Effect sensor located in one of the base 1 and lid 3 and a magnet located in the other of the base 1 and lid 3, with the magnet triggering the Hall Effect sensor when the two are sufficiently proximate (e.g., when the lid 3 is closed). In at least the depicted example embodiment, the thermistors 1204,1206 are Negative Temperature Coefficient (NTC) thermistors; however, in at least some different example embodiments, one or both of the thermistors 1204,1206 may be Positive Temperature Coefficient (PTC) thermistors. Additionally, the thermistors 1204,1206 are an example type of temperature sensor; in at least some different example embodiments (not depicted), one or both of the thermistors 1204,1206 may be replaced with a different type of temperature sensor, such as a diode-based temperature sensor.

The processor 1202 outputs signals to the heating plate 8, drive motor 14, and hot air system motor 16, and to a hot air heating element 1210 and lighting 1212, in accordance with the apparatus's 100 cooking mode as discussed further below. The hot air heating element 1210 is the heating element that comprises part of the hot air system 2 and that is used to heat the air that the system 2 propels throughout the cooking chamber using the propeller 18. The lighting 1212 comprises a light source mounted to an underside of the lid 3 to illuminate the contents of the cooking chamber. The processor 1202 can individually control the heating plate 8, hot air heating element 1210, hot air system motor 16, and drive motor 14, thereby facilitating flexibility in the apparatus's 100 cooking modes as discussed further below. In at least the depicted embodiment the processor 1202 controls the heating plate 8 and the hot air heating element 1210 using a relay, and controls the drive motor 14, hot air system motor 16, and lighting using a silicon controlled rectifier (SCR); in at least some different example embodiments, different switching circuitry may be used.

Figure 11:
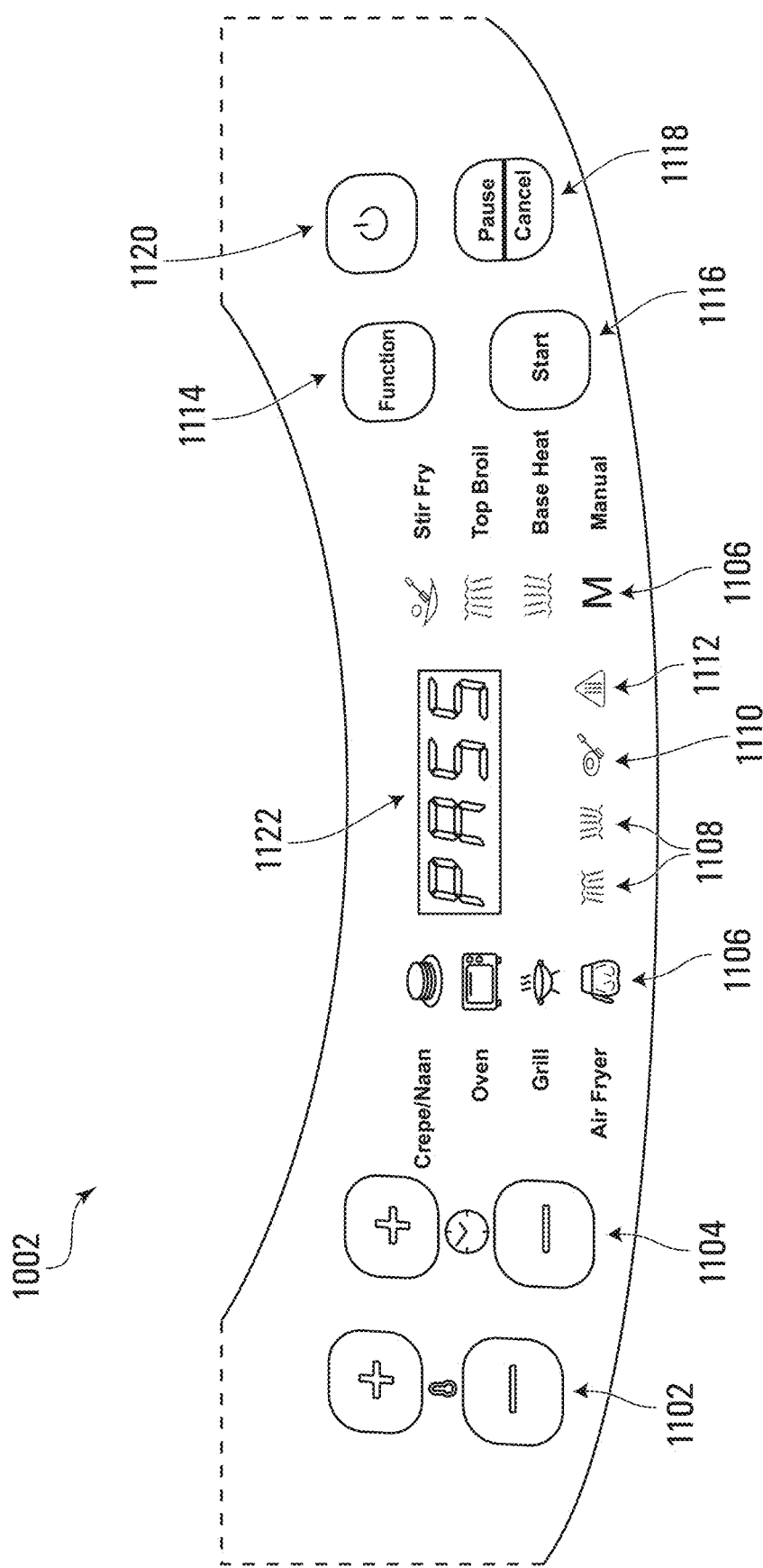
FIG. 11 depicts a user interface comprising part of the apparatus of FIG. 10.
Figure 12:
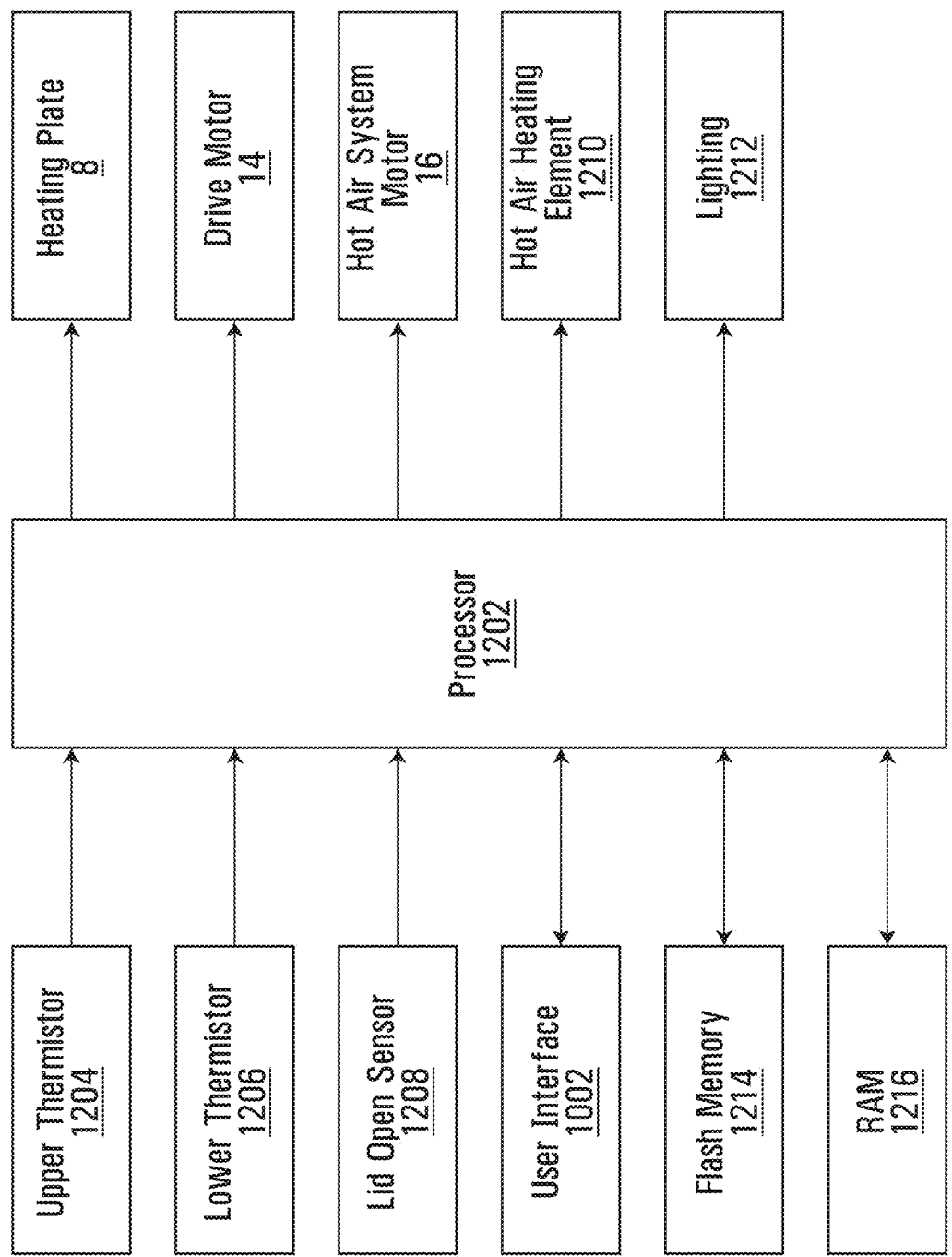
FIG. 12 depicts a control system comprising part of the apparatus FIG. 10.

FIG. 11 shows the apparatus's 100 user interface 1002 in more detail. On the right-hand portion are a power button 1120, used to turn the apparatus 100 on and off; a function button 1114, used to change the apparatus's 100 cooking mode; a start button 1116, used to start the apparatus's 100 operation in a particular cooking mode that has been selected using the function button 1114; and a pause/cancel button 1118. A single press of the pause/cancel button 1118 when the apparatus 100 is operating in a particular cooking mode pauses any countdown timer associated with that cooking mode while maintaining the cooking temperature. Once pressed, to resume the countdown timer the user may do any of the following:

1. press the start button 1116;
2. open and then close the lid 3, which the processor 1202 detects using the lid open sensor 1208; and
3. wait for a timeout period, such as two minutes, without pressing any buttons on the interface 1002 or opening the lid 3.

The pause/cancel button 1118 may also be long-pressed (i.e., pressed and held for at least a long-press period, such as for two seconds), which will end any cooking mode the apparatus 100 is in at the time of the long-press. "Ending" the cooking mode means that the apparatus's 100 countdown timer reduces to zero and the heating plate 8, drive motor 14, hot air system motor 16, and hot air heating element 1210 are shut off.

The user interface 1002 also comprises temperature control buttons 1102 used to increase and decrease the temperature of the cooking chamber; duration control buttons 1104 used to increase and decrease cooking duration; cooking mode indicators 1106 indicating which cooking mode the apparatus 100 is currently in; heating status indicators 1108 indicating whether one or both of the heating plate 8 and hot air heating element 1210 are active; a flip indicator 1110 indicating whether the food in the cooking chamber should be flipped; and a heat warning indicator 1112 indicating whether the apparatus 100 remains potentially dangerously warm to the user's touch notwithstanding that cooking may have ended. In at least the depicted example embodiment, each of the indicators 1106,1108,1110,1112 is a binary indicator in the form of a light that can be turned on or off. In at least some different embodiments (not depicted), any one or more of the indicators 1106,1108,1110,1112 may additionally or alternatively comprise non-binary indicators, such as a text display that displays different text messages.

During cooking, in at least some example embodiments the temperature and duration can be modified by the temperature and duration control buttons 1102,1104 only when the cooking mode has been paused using the pause/cancel button 1118. The user interface 1002 also comprises a light emitting diode (LED) display 1122, which the processor 1202 uses to send simple messages to the user. For example, in at least some example embodiments the temperature control buttons 1102 permit the cooking temperature to be numerically specified by the user (e.g., pushing the "+" button 1102 may increment the current temperature by a set amount such as 5 degrees, while pushing the "-" button may analogously decrease the current temperature); the display 1122 may show the user the current temperature he or she has set. In at least some different example embodiments, one or both of the sets of temperature and duration control buttons 1102,1104 may be different than as depicted in FIG. 11. For example, the temperature control buttons 1102 may alternatively comprise a numeric keypad.

The apparatus 100 is operable in several different cooking modes, with different cooking modes causing the processor 1202 to use the heating plate 8, drive motor 14, hot air system motor 16, and hot air heating element 1210 differently. In at least the depicted example embodiment, the apparatus 100 is operable as a crepe/naan maker (mode 1), a mini-oven (mode 2), a grill (mode 3), an air fryer (mode 4), a stir fryer (mode 5), a top broiler (mode 6), a base broiler (mode 7), and manually (mode 8). The cooking modes are summarized in Table 1:

TABLE 1

| | Cooking Modes | | | | |
|---|---|---|---|---|---|
| Mode | Lower Thermistor 1206 Setting | Upper Thermistor 1204 Shift (relative to lower thermistor 1206) | Preheat Temp. | Output | Default Cooking Time (excl. preheating) |
| 1 | 380° F. (193° C.) | −140° F. (−60° C.) | 380° F. (193° C.) | Plate 8 Hot air system motor 16 Heating element 1210 Lighting 1212 | 15 mins |
| 2 | 350° F. (177° C.) | −86° F. (−30° C.) | 350° F. (177° C.) | Plate 8 Hot air system motor 16 Heating element 1210 Lighting 1212 | 15 mins |
| 3 | 420° F. (216° C.) | −104° F. (−40° C.) | 420° F. (216° C.) | Plate 8 Hot air system motor 16 Heating element 1210 Lighting 1212 | 15 mins |
| 4 | 400° F. (204° C.) | −122° F. (−50° C.) | 400° F. (204° C.) | Plate 8 Hot air system motor 16 Heating element 1210 Lighting 1212 | 20 mins |

TABLE 1-continued

Cooking Modes

| Mode | Lower Thermistor 1206 Setting | Upper Thermistor 1204 Shift (relative to lower thermistor 1206) | Preheat Temp. | Output | Default Cooking Time (excl. pre-heating) |
| --- | --- | --- | --- | --- | --- |
| 5 | 420° F. (216° C.) | −95° F. (−35° C.) | 420° F. (216° C.) | Plate 8 Drive motor 14 Hot air system motor 16 Heating element 1210 Lighting 1212 | 5 mins |
| 6 | 355° F. (179° C.) | N/A | N/A | Heating element 1210 Hot air system motor 16 Lighting 1212 | 15 mins |
| 7 | 420° F. (216° C.) | N/A | N/A | Plate 8 Hot air system motor 16 Lighting 1212 | 15 mins |
| 8 | 400° F. (204° C.) | −104° F. (−40° C.) | N/A | Plate 8 Hot air system motor 16 Heating element 1210 Lighting 1212 | 10 mins |

In Table 1, the "lower thermistor 1206 setting" and the "upper thermistor 1204 shift" represent the temperatures at which the apparatus 100 cooks food during a cooking mode. More particularly, the "lower thermistor 1206 setting" is the temperature target for the inner pot 4 that the processor 1202 reaches by activating the heating plate 8; and the "upper thermistor 1204 shift" is the difference in temperature, relative to the lower thermistor 1206 setting, that defines the temperature target near the propeller 18 that the processor 1202 reaches by activating the hot air heating element 1210. The "preheat temperature" is the temperature target for the cooking chamber that the processor 1202 reaches prior to commencing cooking by activating one or both of the plate 8 and element 1210. The "output" column lists the components of the apparatus 100 that the processor 1202 activates during the cooking mode. The "default cooking time" column lists the default duration for which cooking occurs during the cooking mode after pre-heating has concluded.

The parameters set out in Table 1 for the various cooking modes are examples only, and may be different in at least some different example embodiments. For example, pre-heating may end after a set time (e.g., 5 minutes), instead of in response to reaching the temperature listed in Table 1. Additionally or alternatively, the default cooking times may change in different example embodiments, such as by being adjusted by the user either before or after cooking has started. Additionally, in at least some example embodiments the "lower thermistor 1206 setting" and "upper thermistor 1204 shift" are approximate values only.

The modes of Table 1 are examples of different cooking modes in which the apparatus 100 may operate. More generally, the apparatus 100 may comprise at least a first and a second cooking mode, with the first cooking mode having a lower temperature sensor setting of a first temperature and an upper temperature sensor setting of a second temperature. The second temperature may be less than the first temperature, and at least one of the first and second temperatures of the first cooking mode is different from the first and second temperatures, respectively, of the second cooking mode. When one or both of the upper and lower temperatures differ from the upper and lower temperature sensor settings, the processor 1202 may adjust power to the hot air heating element 1210 and heating plate 8, respectively, in order to cause the upper and lower temperatures to approach the upper and lower temperature settings.

In at least some example embodiments, during heating the processor 1202 periodically turns one or both of the plate 8 and element 1210 on and off until the appropriate target temperature is reached. For example, in at least some example embodiments, when the temperature as measured by the lower thermistor 1206 is rising, the lid 3 is closed, and the lower thermistor 1206 measures a temperature less than a certain temperature differential (e.g., 10° C.) less than the appropriate lower thermistor 1206 setting in Table 1, then the processor 1202 activates the plate 8 constantly at full or partial power until the lower thermistor 1206 measures a temperature within the temperature differential of the lower thermistor 1206 setting. Once the lower thermistor 1206 measures a temperature within the temperature differential of the lower thermistor 1206 setting, the processor 1202 shuts off the plate 8 for a shut-off period, such as 30 seconds. At the end of the shut-off period, the processor 1202 determines whether the lower thermistor 1206 is still less than the appropriate lower thermistor 1206 setting in Table 1. If it is, then the processor 1202 alternates between activating the plate 8 for a first duration (e.g., 18 seconds), and shutting it off for a second duration (e.g., 12 seconds), until the lower thermistor 1206 measures a temperature equal to or exceeding the appropriate lower thermistor 1206 setting.

Additionally or alternatively, during heating when the temperature as measured by the lower thermistor 1206 is dropping, the lid 3 is closed, and the lower thermistor 1206 measures a temperature less than and within a certain temperature differential of the appropriate lower thermistor 1206 setting in Table 1, then the processor 1202 alternates between activating the plate 8 for a first duration (e.g., 18 seconds), and shutting it off for a second duration (e.g., 12 seconds). If the temperature continues to drop until it is more than the temperature differential below the appropriate lower thermistor 1206 setting, then the processor 1202 activates the plate 8 constantly at full or partial power.

Additionally or alternatively, during heating when the lid 3 is open and the lower thermistor 1206 measures a temperature less than a certain temperature differential (e.g., 10° C.) below the appropriate lower thermistor 1206 setting in Table 1, then the processor 1202 activates the plate 8 constantly at full or partial power until the lower thermistor 1206 measures a temperature within the temperature differential of the lower thermistor 1206 setting. Once the lower thermistor 1206 measures a temperature within the temperature differential of the lower thermistor 1206 setting, the processor 1202 alternates between activating the plate 8 for a first duration (e.g., 24 seconds) and shutting it off for a second duration (e.g., 6 seconds).

In at least some example embodiments, once the appropriate lower thermistor 1206 setting has been reached for any of the above examples, the processor 1202 operates the plate 8 in a suitable holding method. For example, the processor 1202 in at least some example embodiments keeps the plate 8 constantly on at less than full power. In at least some different embodiments, the processor 1202 turns the plate 8 on and off, whether at full power or at less than full power. The processor 1202 may turn the plate 8 on and off periodically, and for any given period the durations for which the plate 8 is on and off may be identical in some example embodiments and different in others.

In at least some example embodiments, in any one or more of the cooking modes the processor 1202 determines when to activate the flip indicator 1110 by determining whether the elapsed cooking time since cooking of a dish began using that mode represents at least a threshold percentage of the total cooking time set for that dish, the default value for which is listed in the "Default Cooking Time" column of Table 1. The threshold percentage may be, for example, 60% of the total set cooking time. When the threshold percentage is reached, the processor 1202 activates the flip indicator 1110.

The processor 1202 deactivates the flip indicator 1110 in response to detecting, using the lid open sensor 1208, that the lid 3 has been opened and subsequently closed. Additionally or alternatively, in at least some example embodiments the processor 1202 may deactivate the flip indicator 1110 following pressing of one of the buttons comprising the user interface 1002, such as the start button 1116.

In at least some example embodiments, in addition or as an alternative to the binary flip indicator of FIG. 11, the flip indicator 1110 comprises one or both of a message (e.g., a text message, such as "FLIP", on the display 1122) and a sound. In at least a subset of those embodiments in which the text message is shown with the binary indicator, the message may automatically disappear after an expiry period, while the binary indicator remains on until deactivated as described above.

In at least some example embodiments, in any one or more of the cooking modes in which the hot air heating element 1210 is by default on, the processor 1202 automatically shuts off the hot air heating element 1210 in response to a signal from the lid open sensor 1208 that the lid 3 is open. In at least some example embodiments, the processor 1202 may also pause the cooking mode when the hot air heating element 1210 is on and the lid 3 is opened.

In at least some example embodiments, the apparatus 100 further comprises a "cooking mode extension" feature in which at or near the end of any of the cooking modes, the user may provide input to the processor 1202 via the user interface 1002 that the cooking mode the apparatus 100 is current operating in is to be extended, following which the processor 1202 automatically extends that cooking mode by a certain duration. When extending a cooking mode, any pre-heating that would otherwise occur if that cooking mode were to end and then re-start is bypassed, and instead the apparatus 100 cooks the food continuously as a result of the cooking mode being extended instead of ending and re-starting. Furthermore, in the stir fryer cooking mode, the stirrer 5 continues to rotate when the stir fryer cooking mode is extended, as opposed to stopping as would occur if the stir fryer cooking mode were stopped and then re-started. In certain cases this may help prevent food from burning. Any suitable input via the user interface 1002 may be used as an indicator that the cooking mode is to be extended. For example, in at least one example embodiment, the user may push an extension input such as the start button 1116 within fifteen seconds of the end of the stir fryer cooking mode, with the fifteen seconds being an example of an "extension window" during which the processor 1202 is receptive to the user extending the current cooking mode. If the extension input is provided during the extension window, the processor 1202 extends the cooking mode by an extension duration. In at least some example embodiments, a cooking mode may be extended multiple times without the cooking mode ending; that is, at or near the end of each extension duration may be an extension window during which the user may provide another extension input to again extend the cooking mode.

The terminology used herein is for the purpose of describing particular embodiments only and is not intended to be limiting. Accordingly, as used herein, the singular forms "a", "an", and "the" are intended to include the plural forms as well, unless the context clearly indicates otherwise. It will be further understood that the terms "comprises" and "comprising", when used in this specification, specify the presence of one or more stated features, integers, steps, operations, elements, and components, but do not preclude the presence or addition of one or more other features, integers, steps, operations, elements, components, and groups. Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", and "coupling" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. Further, when used in conjunction with a numerical value, the words "approximate" and "approximately" mean within +/−10% of that numerical value, unless the context indicates otherwise.

It is contemplated that any part of any aspect or embodiment discussed in this specification can be implemented or combined with any part of any other aspect or embodiment discussed in this specification.

One or more example embodiments have been described by way of illustration only. This description is presented for purposes of illustration and description, but is not intended to be exhaustive or limited to the form disclosed. It will be apparent to persons skilled in the art that a number of variations and modifications can be made without departing from the scope of the claims.

The invention claimed is:

1. A cooking apparatus comprising:
a base comprising a heating plate and an inner pot located over the heating plate such that the inner pot is heated by heat emitted by the heating plate;
a lid closable over the inner pot to form a cooking chamber, wherein the lid comprises a hot air system configured to direct hot air into the cooking chamber and a stirrer drive device comprising a drive motor and configured to be attached to a stirrer, and wherein the hot air system comprises a hot air heating element;
an upper temperature sensor located in the lid;
a lower temperature sensor located in the base;
a processor, communicatively coupled to the upper and the lower temperature sensors; and
a memory, communicatively coupled to the processor, storing computer program code that is executable by the processor and that, when executed by the processor, causes the processor to operate in one of multiple cooking modes, wherein for each of the cooking modes the computer program code causes the processor to perform a method comprising:
measuring an upper and a lower temperature using the upper and the lower temperature sensors, respectively;
comparing the upper and the lower temperature to an upper and a lower temperature sensor setting, respectively;
when the upper temperature differs from the upper temperature sensor setting, adjusting power to the hot air heating element such that the upper temperature approaches the upper temperature sensor setting; and
when the lower temperature differs from the lower temperature sensor setting, adjusting power to the heating plate such that the lower temperature approaches the lower temperature sensor setting.

2. The apparatus of claim 1, wherein the hot air system comprises a hot air system motor, and for at least one of the cooking modes the method further comprises activating at least one of the motors.

3. The apparatus of claim 1, further comprising a flip indicator, wherein at least one of the cooking modes is associated with a total cooking time, and wherein the method further comprises, for each of at least some of the cooking modes associated with the total cooking time:
monitoring elapsed cooking time during the cooking mode;
comparing the elapsed cooking time to the total cooking time; and
when the elapsed cooking time is at least a threshold percentage of the total cooking time, activating the flip indicator.

4. The apparatus of claim 3, further comprising a lid open sensor configured to detect whether the lid is opened or closed, and wherein the method further comprises, for each of at least some of the cooking modes associated with the total cooking time, deactivating the flip indicator in response to the lid being opened.

5. The apparatus of claim 1, further comprising a user interface communicatively coupled to the processor and wherein the method further comprises receiving, via the user interface, a numerically specified temperature for at least one of the upper and lower temperature sensor settings.

6. The apparatus of claim 5, wherein the method further comprises receiving a signal via the user interface to pause cooking during one of the cooking modes, and wherein the numerically specified temperature is received while cooking is paused.

7. The apparatus of claim 1, further comprising a user interface communicatively coupled to the processor and wherein the method further comprises, when the apparatus is operating in one of the cooking modes:
receiving, via the user interface, within an extension window extending from an end of the cooking mode, an extension input indicating that the cooking mode is to be extended; and
in response to the extension input, extending the cooking mode by an extension duration without ending the cooking mode.

8. The apparatus of claim 7, wherein the stirrer rotates in the cooking mode in which the apparatus is operating when the extension input is received.

9. The apparatus of claim 1, wherein the stirrer drive device further comprises a drive gear rotatable by the drive motor.

10. A cooking apparatus comprising:
a base comprising an inner pot and a heating plate under the inner pot such that the inner pot is heated by heat emitted by the heating plate;
a lid closable over the inner pot to form a cooking chamber, wherein the lid comprises a hot air system configured to direct hot air into the cooking chamber and a stirrer drive device comprising a drive motor, and wherein the hot air system comprises a hot air heating element;
a stirrer attached to the stirrer drive device, the stirrer comprising:
a gear assembly detachably coupled to an underside of the lid; and
a stirring paddle coupled to the gear assembly such that rotation of the gear assembly causes the stirring paddle to rotate;
an upper temperature sensor located in the lid;
a lower temperature sensor located in the base;
a processor, communicatively coupled to the upper and lower temperature sensors; and
a memory, communicatively coupled to the processor, storing computer program code that is executable by the processor and that, when executed by the processor, causes the processor to operate in one of multiple cooking modes, wherein for each of the cooking modes the computer program code causes the processor to perform a method comprising:
measuring an upper and a lower temperature using the upper and the lower temperature sensors, respectively;
comparing the upper and the lower temperature to an upper and a lower temperature sensor setting, respectively;
when the upper temperature differs from the upper temperature sensor setting, adjusting power to the hot air heating element such that the upper temperature approaches the upper temperature sensor setting; and
when the lower temperature differs from the lower temperature sensor setting, adjusting power to the heating plate such that the lower temperature approaches the lower temperature sensor setting.

11. The apparatus of claim 10, wherein the hot air system comprises a hot air system motor, and for at least one of the cooking modes the method further comprises activating at least one of the motors.

12. The apparatus of claim 10, further comprising a flip indicator, wherein at least one of the cooking modes is associated with a total cooking time, and wherein the method further comprises, for each of at least some of the cooking modes associated with the total cooking time:

monitoring elapsed cooking time during the cooking mode;

comparing the elapsed cooking time to the total cooking time; and when the elapsed cooking time is at least a threshold percentage of the total cooking time, activating the flip indicator.

13. The apparatus of claim 12, further comprising a lid open sensor configured to detect whether the lid is opened or closed, and wherein the method further comprises, for each of at least some of the cooking modes associated with the total cooking time, deactivating the flip indicator in response to the lid being opened.

14. The apparatus of claim 10, further comprising a user interface communicatively coupled to the processor and wherein the method further comprises receiving, via the user interface, a numerically specified temperature for at least one of the upper and lower temperature sensor settings.

15. The apparatus of claim 14, wherein the method further comprises receiving a signal via the user interface to pause cooking during one of the cooking modes, and wherein the numerically specified temperature is received while cooking is paused.

16. The apparatus of claim 10, further comprising a user interface communicatively coupled to the processor and wherein the method further comprises, when the apparatus is operating in one of the cooking modes:

receiving, via the user interface, within an extension window extending from an end of the cooking mode, an extension input indicating that the cooking mode is to be extended; and in response to the extension input, extending the cooking mode by an extension duration without ending the cooking mode.

17. The apparatus of claim 16, wherein the stirrer rotates in the cooking mode in which the apparatus is operating when the extension input is received.

18. The apparatus of claim 10, wherein the stirrer drive device further comprises a drive gear rotatable by the drive motor.

\* \* \* \* \*